US012661300B2

(12) United States Patent
Zhao et al.

(10) Patent No.: US 12,661,300 B2
(45) Date of Patent: Jun. 23, 2026

(54) PULL TYPE ROTARY MASSAGE NOZZLE

(71) Applicant: Guangzhou Rising Dragon Recreation Industrial Co., Ltd., Guangzhou (CN)

(72) Inventors: Huaibin Zhao, Guangzhou (CN); Shiyang Fan, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 749 days.

(21) Appl. No.: 18/166,502

(22) Filed: Feb. 9, 2023

(65) Prior Publication Data

US 2024/0122800 A1 Apr. 18, 2024

(30) Foreign Application Priority Data

Oct. 13, 2022 (CN) ......................... 202222694692.7

(51) Int. Cl.

*A61H 3/00* (2006.01)
*A61H 9/00* (2006.01)
*A61H 33/00* (2006.01)
*A61H 33/06* (2006.01)

(52) U.S. Cl.

CPC ....... *A61H 33/6068* (2013.01); *A61H 9/0071* (2013.01); *A61H 33/06* (2013.01);
(Continued)

(58) Field of Classification Search

CPC ................ A61H 33/6068; A61H 33/06; A61H 33/6063; A61H 33/027; A61H 33/6052;
(Continued)

(56) References Cited

U.S. PATENT DOCUMENTS 5,810,257 A * 9/1998 Ton .................... A61H 33/6063
601/169
5,920,925 A * 7/1999 Dongo ............... A61H 33/6057
4/492

(Continued)

FOREIGN PATENT DOCUMENTS

CN 212120434 U * 12/2020 ............... A61H 9/00

OTHER PUBLICATIONS

CN-212120434-U Translation (Year: 2025).*

*Primary Examiner* — David P Angwin
*Assistant Examiner* — William R Klotz
(74) *Attorney, Agent, or Firm* — Andrew C. Cheng

(57) ABSTRACT

A pull type rotary massage nozzle sequentially includes a nozzle holder, a nozzle core seat, a nozzle surface cover, and a nozzle core assembly. The nozzle core seat is detachably mounted on the nozzle holder. The nozzle surface cover is fixedly mounted on the nozzle core seat. The nozzle core assembly is mounted in the nozzle core seat and may circumferentially rotate about a mounting axle relative to the nozzle core seat and the nozzle surface cover, and may also axially float or sink along the mounting axle relative to the nozzle core seat and nozzle surface cover. The nozzle surface cover is provided with a static torsion rib. The nozzle core assembly is provided with a dynamic torsion rib. The dynamic torsion rib is selectively engaged with or separated from the static torsion rib along with floating or sinking of the nozzle core assembly.

11 Claims, 8 Drawing Sheets

(52) U.S. Cl.
CPC ................ *A61H 2201/0107* (2013.01); *A61H 2201/1454* (2013.01); *A61H 2201/1664* (2013.01); *A61H 2201/1671* (2013.01)

(58) Field of Classification Search
CPC .............. A61H 33/6031; A61H 9/0071; A61H 2201/0107; A61H 2201/1454; A61H 2201/1664; A61H 2201/1671
USPC ....................................... 4/541.6, 541.1, 492
See application file for complete search history.

(56) References Cited

U.S. PATENT DOCUMENTS

| | | | | |
|---|---|---|---|---|
| 6,470,509 B1 * | 10/2002 | Ayeni | A61H 33/6063 | 4/541.6 |
| 6,860,437 B1 * | 3/2005 | Amendt | A61H 33/6063 | 239/383 |
| 8,458,825 B2 * | 6/2013 | Peng | A61H 33/6063 | 4/492 |
| 8,689,370 B2 * | 4/2014 | Fleischer | A61H 33/6052 | 4/492 |
| 11,759,386 B2 * | 9/2023 | Liu | A61H 33/6021 | 4/615 |
| 2009/0126099 A1 * | 5/2009 | Holtsnider | A61H 33/027 | 239/428.5 |
| 2009/0133188 A1 * | 5/2009 | Peng | A61H 33/6063 | 4/541.6 |
| 2012/0272447 A1 * | 11/2012 | Fleischer | A61H 33/027 | 4/541.6 |
| 2021/0259908 A1 * | 8/2021 | Liu | B05B 3/04 | |

* cited by examiner

PULL TYPE ROTARY MASSAGE NOZZLE

FIELD OF TECHNOLOGY

The present disclosure relates to the technical field of massage nozzles, and in particular to a pull type rotary massage nozzle easy to mount/dismount applied in bathtubs or swimming pools.

BACKGROUND

As an accessory for an SPA massage bathtub or swimming pool, a massage nozzle is used to spray water with a certain pressure for massage. To distinguish a structure of rotating water from the existing massage nozzle, the applicant applied for a Chinese patent with a number of "CN202020204206.7" and a name of "a pull type rotary massage nozzle" on Feb. 24, 2020. The patent improves the appearance consistency and rotation coordination of the massage nozzle, and the mounting is smooth. A mounted surface cover has a small protrusion, which improves the user's perception and user experience. However, the applicant finds that after the thickness of the surface cover is reduced, there is a shortcoming of inconvenience in mounting and dismounting. During assembly or disassembly between a nozzle and a nozzle holder, it is difficult for his fingers to grasp the edge of the surface cover because the surface cover is too thin, and the disassembly or assembly between the nozzle and the nozzle holder can only be implemented by using a tool or pressing the surface cover to rotate to drive a nozzle core seat to rotate, which greatly reduces the disassembly or assembly efficiency during mounting and maintenance. Similarly, when the nozzle is opened or closed, it is also implemented by turning the nozzle core seat to be aligned with/offset from the nozzle holder (when a water inlet of the nozzle core seat is aligned with a water inlet tube of the nozzle holder, the nozzle is opened, and when the water inlet of the nozzle core seat is offset from the water inlet tube of the nozzle holder, the nozzle is closed). The thin surface cover also brings inconvenience to opening and closing of the nozzle, which affects the user experience. Based on this, to implement rapid disassembly and assembly between the nozzle and the nozzle holder, and rapid opening and closing of the nozzle, the present disclosure provides a pull type rotary massage nozzle easy to mount/dismount.

SUMMARY

In view of the defects existing in the prior art, the present disclosure provides a pull type rotary massage nozzle which is easy to mount and dismount. With float and sink design of a nozzle core assembly, a dynamic torsion rib arranged on the nozzle core assembly and a static torsion rib arranged on a nozzle surface cover are selectively and rapidly engaged with or separated from each other. During dismounting, the dynamic and static torsion ribs are matched and engaged with each other such that a nozzle core seat, the nozzle surface cover, and the nozzle core assembly form one rigid unit, and a force is exerted on a nozzle core via water outlets on the nozzle core to drive the surface cover and the nozzle core seat to rotate for rapid disassembly and assembly between the nozzle and a nozzle holder.

In one aspect, the present disclosure provides a pull type rotary massage nozzle which sequentially comprises a nozzle holder, a nozzle core seat, a nozzle surface cover, and a nozzle core assembly. The nozzle core seat is detachably mounted on the nozzle holder. The nozzle surface cover is fixedly mounted on the nozzle core seat. The nozzle core assembly passes through the nozzle surface cover to be mounted in the nozzle core seat, the nozzle core assembly is capable of circumferentially rotating about a mounting axle relative to the nozzle core seat and the nozzle surface cover, and is also capable of axially floating or sinking along the mounting axle relative to the nozzle core seat and nozzle surface cover. An inner surface of the nozzle surface cover is provided with a static torsion rib extending toward the nozzle core assembly, an outer surface of the nozzle core assembly is provided with a dynamic torsion rib extending toward the nozzle surface cover, and the dynamic torsion rib is selectively engaged with or separated from the static torsion rib along with floating or sinking of the nozzle core assembly.

Preferably, the nozzle core assembly comprises a nozzle core and a steel needle. The steel needle acts as the mounting axle and has a first end fixedly connected to the nozzle core and a second end arranged in a cavity of the nozzle core seat. The cavity defines an axial path. The second end of the steel needle is capable of freely rotating in the cavity such that the nozzle core assembly can circumferentially rotate. The second end of the steel needle is capable of sliding along the axial path such that the nozzle core assembly can axially float or sink.

Preferably, the second end of the steel needle is provided with an external thread and is detachably mounted in the cavity by threaded connection with a rotary ball head.

Preferably, a bottom of the nozzle core seat is detachably provided with a pull core seat, the pull core seat is provided with the cavity which is recessed in a direction from a bottom of the pull core seat to the nozzle core assembly, the cavity is communicated with an interior of the nozzle core seat via an axial hole, and the second end of the steel needle is arranged in the cavity after passing through the axial hole.

Preferably, the pull core seat is an integrated wear-resistant plastic.

Preferably, a rotary support is arranged in the nozzle core seat and is positioned between the cavity and the nozzle core, a central axial hole matched with the steel needle is arranged in the rotary support, and the second end of the steel needle passes through the central axial hole of the rotary support to be received in the cavity.

Preferably, an outer end of the rotary support around the central axial hole is provided with an axial hole boss extending toward the nozzle core.

Preferably, the nozzle core comprises a Y-shaped flow channel which comprises a water inlet and two water outlets communicated with the water inlet, and the dynamic torsion rib is arranged on an outer surface of the Y-shaped flow channel close to the water outlets.

Preferably, the nozzle holder comprises an air inlet tube and a water inlet tube, a water inlet in communication with the water inlet tube and an air inlet in communication with the air inlet tube are arranged on the nozzle core seat, and the water inlet of the Y-shaped flow channel is communication with the water inlet and the air inlet of the nozzle core seat.

The present disclosure has the following beneficial effects:

In the pull type rotary massage nozzle provided by the present disclosure, with the float and sink design of the nozzle core assembly, the dynamic torsion rib arranged on the nozzle core assembly and the static torsion rib arranged on the nozzle surface cover are selectively and rapidly matched/engaged with or separated from each other. When the massage nozzle works, a water flow will push the nozzle core assembly to float upward relative to the nozzle core seat and the nozzle surface cover, the dynamic torsion rib of the nozzle core assembly is separated from the static torsion rib of the nozzle surface cover, and the nozzle core assembly is driven by the water flow to carry out water spraying by rotation. When the massage nozzle does not work and needs to be dismounted, the nozzle core assembly is pressed until the end of a float and sink stroke and then rotated, the nozzle core assembly sinks relative to the nozzle core seat and the nozzle surface cover first, then the dynamic torsion rib of the nozzle core assembly contacts and abuts with the static torsion rib of the nozzle surface cover during rotation, the nozzle core seat, the nozzle surface cover, and the nozzle core assembly form one rigid unit after the dynamic and static torsion ribs abut and match with each other, and a force is exerted on the nozzle core via the water outlets on the nozzle core to drive the surface cover and the nozzle core seat to rotate for disassembly and assembly between the nozzle and the nozzle holder. Similarly, after the components form the rigid body, the force is exerted on the nozzle core via the water outlets on the nozzle core to drive the surface cover and the nozzle core seat to rotate by a certain angle, and the water inlet of the nozzle core seat is aligned with/offset from the water inlet tube of the nozzle holder to open/close the nozzle. The pull type rotary massage nozzle retains design of the surface cover with a hollow structure, and allows the nozzle core assembly to rotate to spray water via the water flow, which not only reduces the thickness of the surface cover and improves the consistency of overall appearance, but also maintains the stability and coordination of rotation. The float and sink design of the nozzle core assembly may also allow the massage nozzle to be rapidly assembled or disassembled and opened or closed, thereby improving the efficiency of disassembly and assembly, reducing the mounting and maintenance costs, and improving the user experience.

DESCRIPTION OF THE EMBODIMENTS

The technical solution of the present disclosure is further described below in conjunction with the accompanying drawings and the embodiments.

In the description of the present disclosure, it should be understood that the orientational or positional relationships indicated by the terms "upper", "lower", "left", "right", "top", "bottom", etc. are the orientational or positional relationships shown in the accompanying drawings, merely for the convenience of describing the present disclosure and simplifying the description, rather than indicating or implying that the referred apparatus or element must have a particular orientation or be constructed and operated in a particular orientation, and therefore cannot be understood as limiting the scope of the present disclosure.

Embodiment

Figure 1:
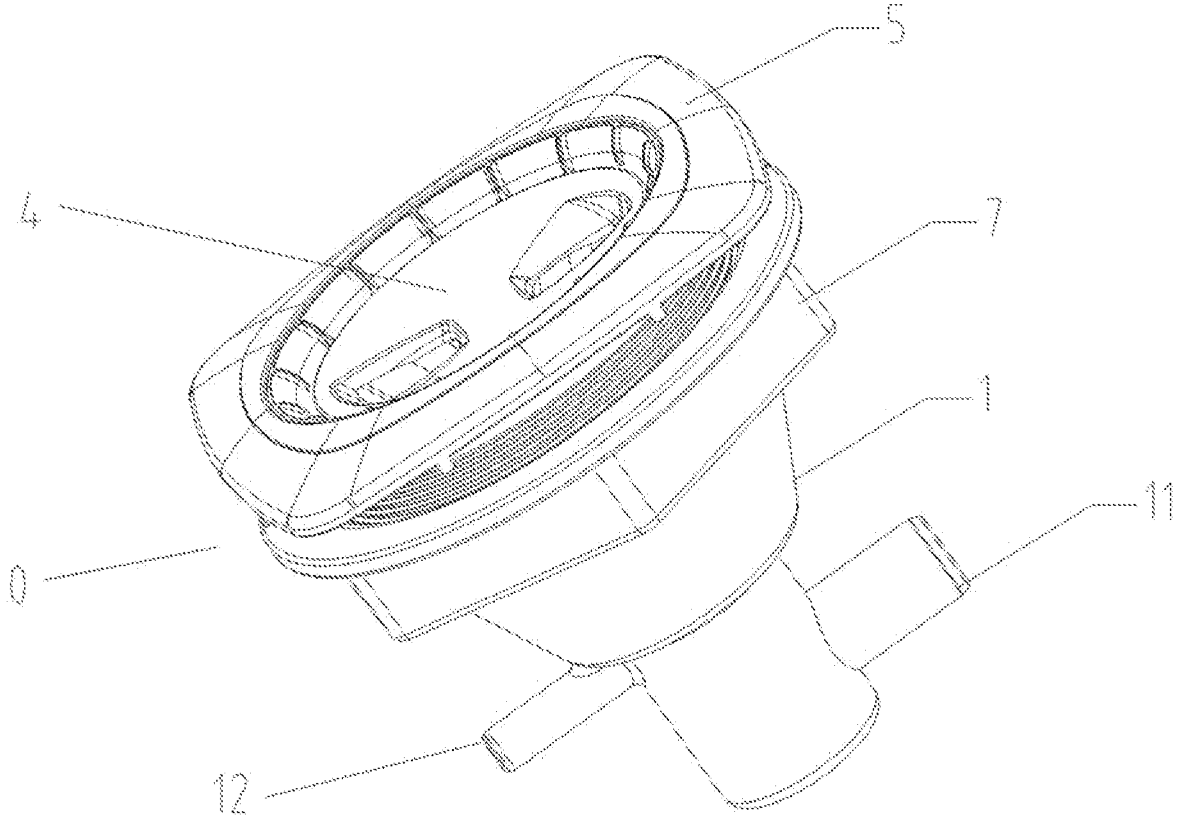
FIG. 1 is a three-dimensional view of a pull type rotary massage nozzle provided by an embodiment of the present disclosure.
Figure 2:
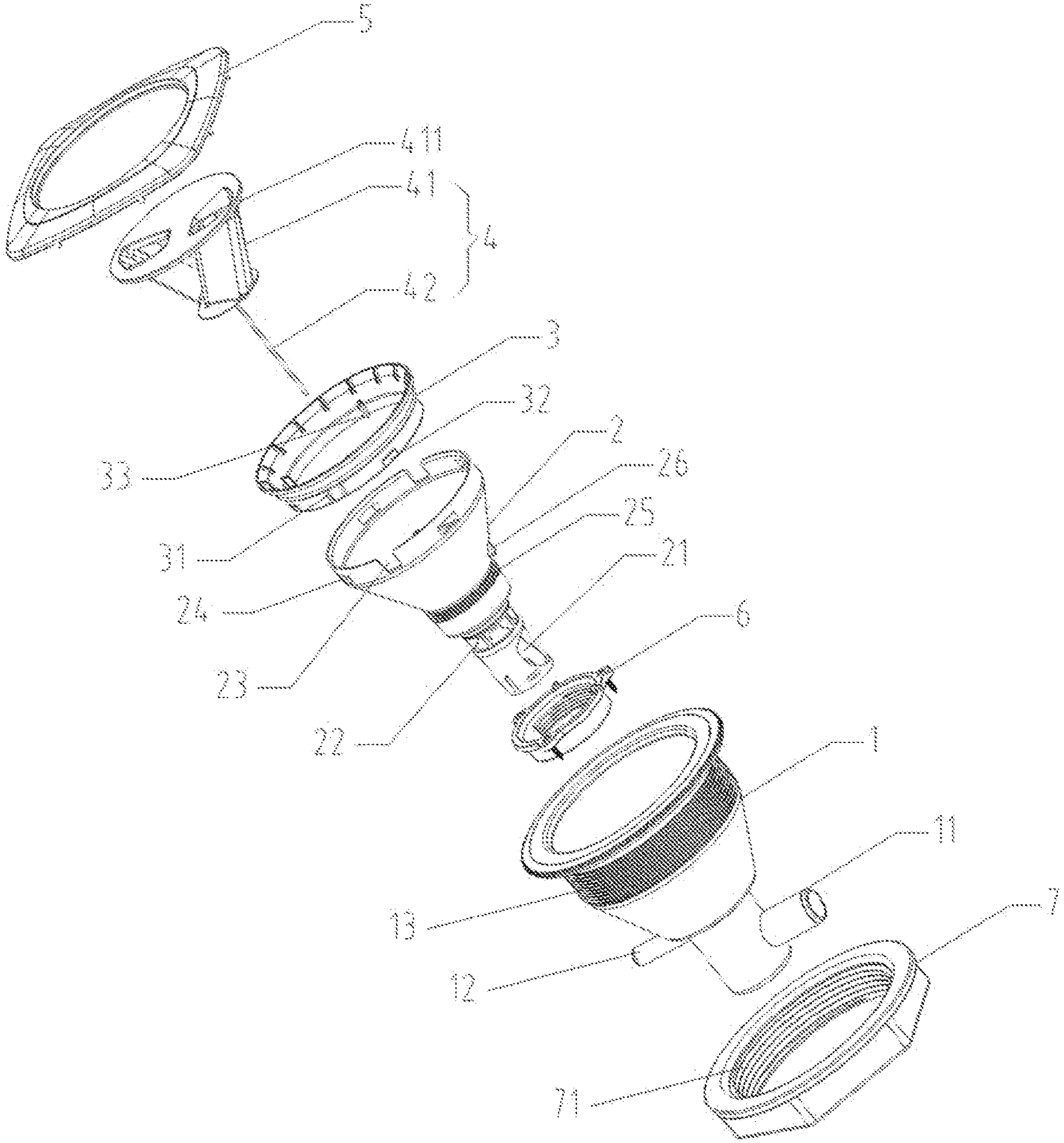
FIG. 2 is an exploded view of the pull type rotary massage nozzle in FIG. 1.

Referring to FIG. 1 and FIG. 2, the specific embodiment of the present disclosure provides a pull type rotary massage nozzle 0 which is easy to mount/dismount. The pull type rotary massage nozzle 0 comprises a lock nut 7, a nozzle holder 1, a mounting base 6, a nozzle core seat 2, a nozzle surface cover 3, a nozzle core assembly 4, and a decorative surface cover 5 assembled in sequential order.

Figure 5:
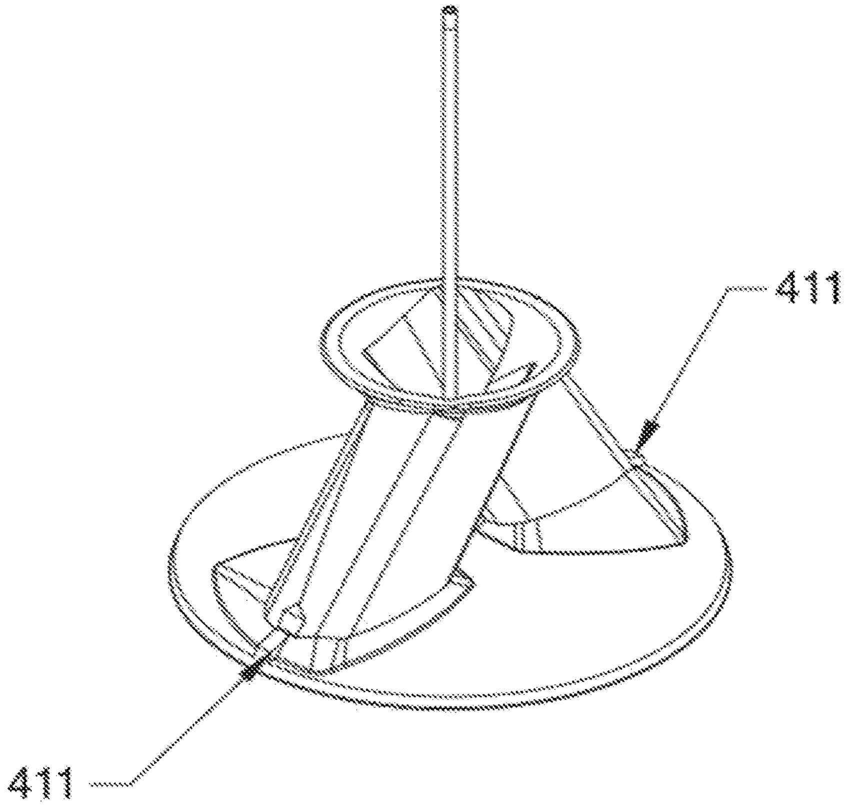
FIG. 5 is a three-dimensional view of a nozzle core assembly.
Figure 6:
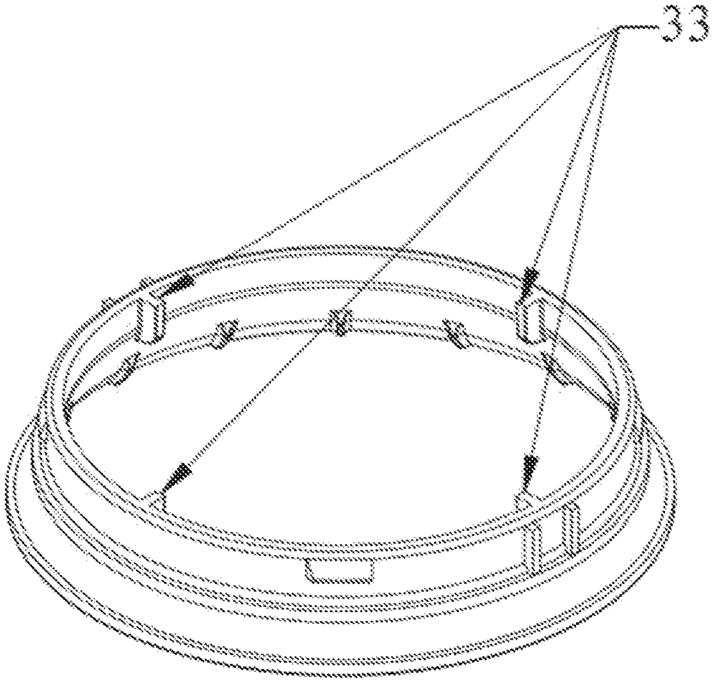
FIG. 6 is a three-dimensional view of a nozzle surface cover.

Wherein, the nozzle core seat 2 is detachably mounted on the nozzle holder 1 via the mounting base 6, the nozzle surface cover 3 is fixedly mounted on the nozzle core seat 2, and the nozzle core assembly 4 is mounted in the nozzle core seat 2 and passes through the nozzle surface cover 3. The nozzle core assembly 4 may circumferentially rotate about a mounting axle (i.e., a steel needle 42 in this embodiment) relative to the nozzle core seat 2 and the nozzle surface cover 3, and the nozzle core assembly 4 may also axially float and sink along the mounting axle relative to the nozzle core seat 2 and the nozzle surface cover 3. Referring to FIG. 6 also, an inner surface of the nozzle surface cover 3 is provided with static torsion ribs 33 which extend toward the nozzle core assembly 4. Referring to FIG. 5 also, an outer surface of the nozzle core assembly 4 is provided with dynamic torsion ribs 411 extending toward the nozzle surface cover 3. The dynamic torsion ribs 411 are selectively matched with or separated from the static torsion ribs 33 along with floating or sinking of the nozzle core assembly 4. Specifically, in combination with FIG. 9, when the massage nozzle is used for spraying water, a water flow will push the nozzle core assembly 4 to float upward relative to the nozzle core seat 2 and the nozzle surface cover 3 to form a floating state, the dynamic torsion rib 411 of the nozzle core assembly 4 is separated from the static torsion rib 33 of the nozzle surface cover 3, and the nozzle core assembly 4 is driven by the water flow to carry out water spraying by free rotation; and in combination with FIG. 10, when the massage nozzle does not work and needs to be assembled or disassembled, the nozzle core assembly 4 may be pressed until the end of a float and sink stroke to form a sinking state, then the nozzle core assembly 4 starts can be rotated manually until the dynamic torsion ribs 411 of the nozzle core assembly 4 contact and abut with the static torsion ribs 33 of the nozzle surface cover 3 such that the nozzle core seat 2, the nozzle surface cover 3, and the nozzle core assembly 4 form one rigid body after the dynamic and static torsion ribs 411 and 33 abut and match with each other. A force is exerted on a nozzle core via water outlets on the nozzle core to drive the surface cover and the nozzle core seat to rotate for rapid assembly and disassembly between the nozzle and the nozzle holder.

Specifically, referring to FIG. 3, FIG. 4, FIG. 9, and FIG. 10, a structure for the nozzle core assembly to float and sink is further disclosed, where the nozzle core assembly 4 includes a nozzle core 41 and a steel needle 42, the steel needle 42 is positioned on the mounting axis, a first end of the steel needle 42 is fixedly connected to the nozzle core 41, a second end of the steel needle 42 is arranged in a pull cavity 93 of the nozzle core seat 2, an axial path is further arranged in the pull cavity 93, and the second end of the steel needle 42 is capable of freely rotating in the pull cavity 93 such that the nozzle core assembly 4 can circumferentially rotate. The second end of the steel needle 42 is also capable of sliding in the pull cavity 93 along the axial path such that the nozzle core assembly 4 can axially float or sink.

Further, the second end of the steel needle 42 is provided with an external thread 421, and the second end of the steel needle 42 is detachably mounted in the pull cavity 93 by threaded connection with a rotary ball head 10. Furthermore, a bottom of the nozzle core seat 2 is detachably provided with a pull core seat 9, the pull core seat 9 is provided with the pull cavity 93 recessed in a direction from the bottom to the nozzle core assembly 4, the pull cavity 93 is connected to an interior of the nozzle core seat 2 via an axial hole 94. The second end of the steel needle 42 is in threaded connection with the rotary ball head 10 after passing through the axial hole 94, and the rotary ball head 10 rotates circumferentially and floats or sinks axially in the pull cavity 93 along with the nozzle core assembly 4. To make the pull core seat have a longer service life, in this embodiment, the pull core seat is an integrated wear-resistant plastic.

Figure 8:
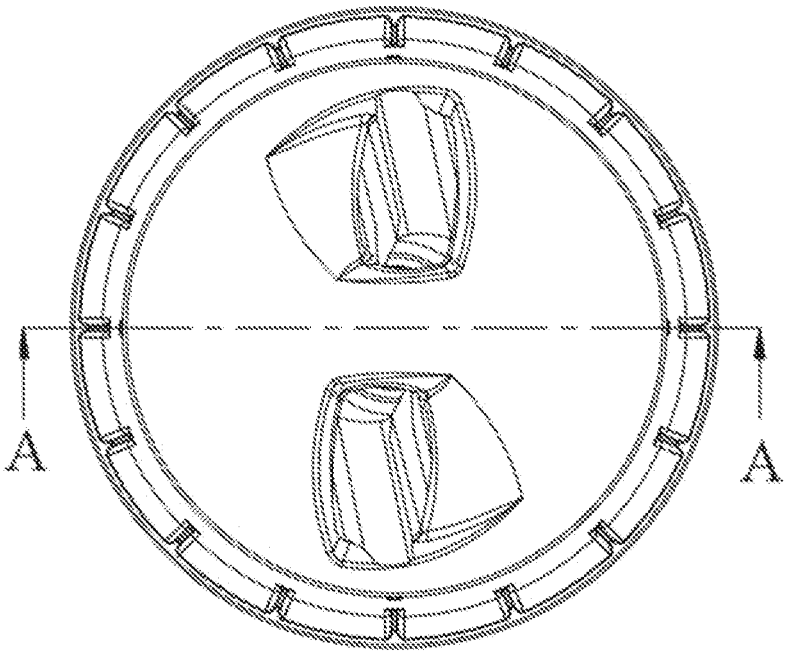
FIG. 8 is a top view of the components in FIG. 3 after being assembled.
Figure 9:
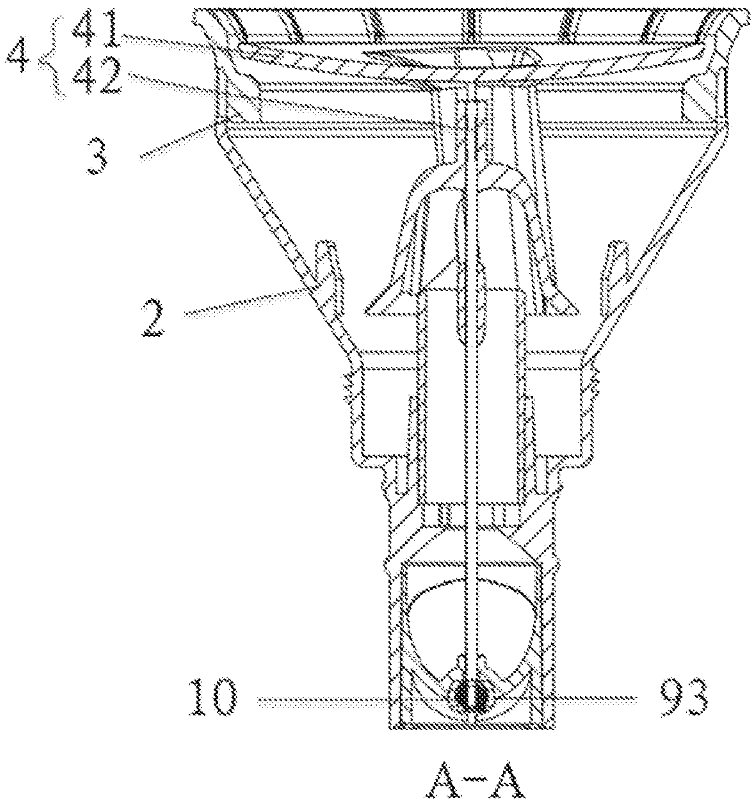
FIG. 9 is a view of a section A-A during floating of the nozzle core assembly in FIG. 8.
Figure 10:
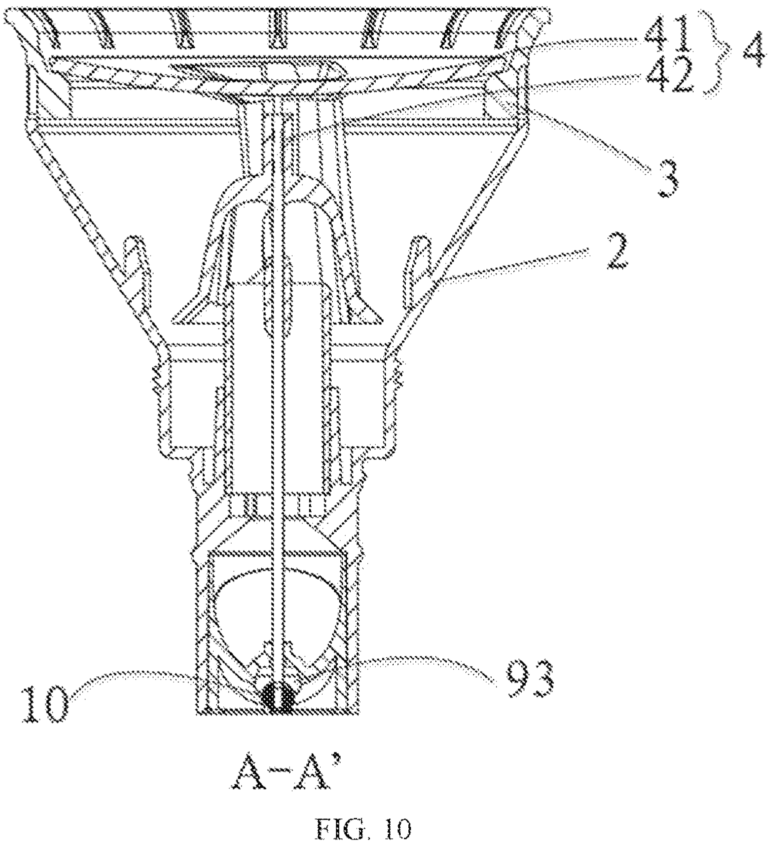
FIG. 10 is a view of a section A-A' during sinking of the nozzle core assembly in FIG. 8.

In addition, in combination with FIG. 8, FIG. 9, and FIG. 10, the float and sink stroke of the nozzle core assembly is described. When the rotary ball head 10 floats up to a top end surface of the pull cavity 93, it reaches a floating end point, and the top end surface of the pull cavity restricts the nozzle core assembly 4 to continue floating up. When the nozzle core assembly sinks until the nozzle core 41 contacts and abuts with the nozzle surface cover 3, it reaches a sinking end point, and the nozzle surface cover 3 restricts the nozzle core assembly 4 to continue sinking.

Figure 3:
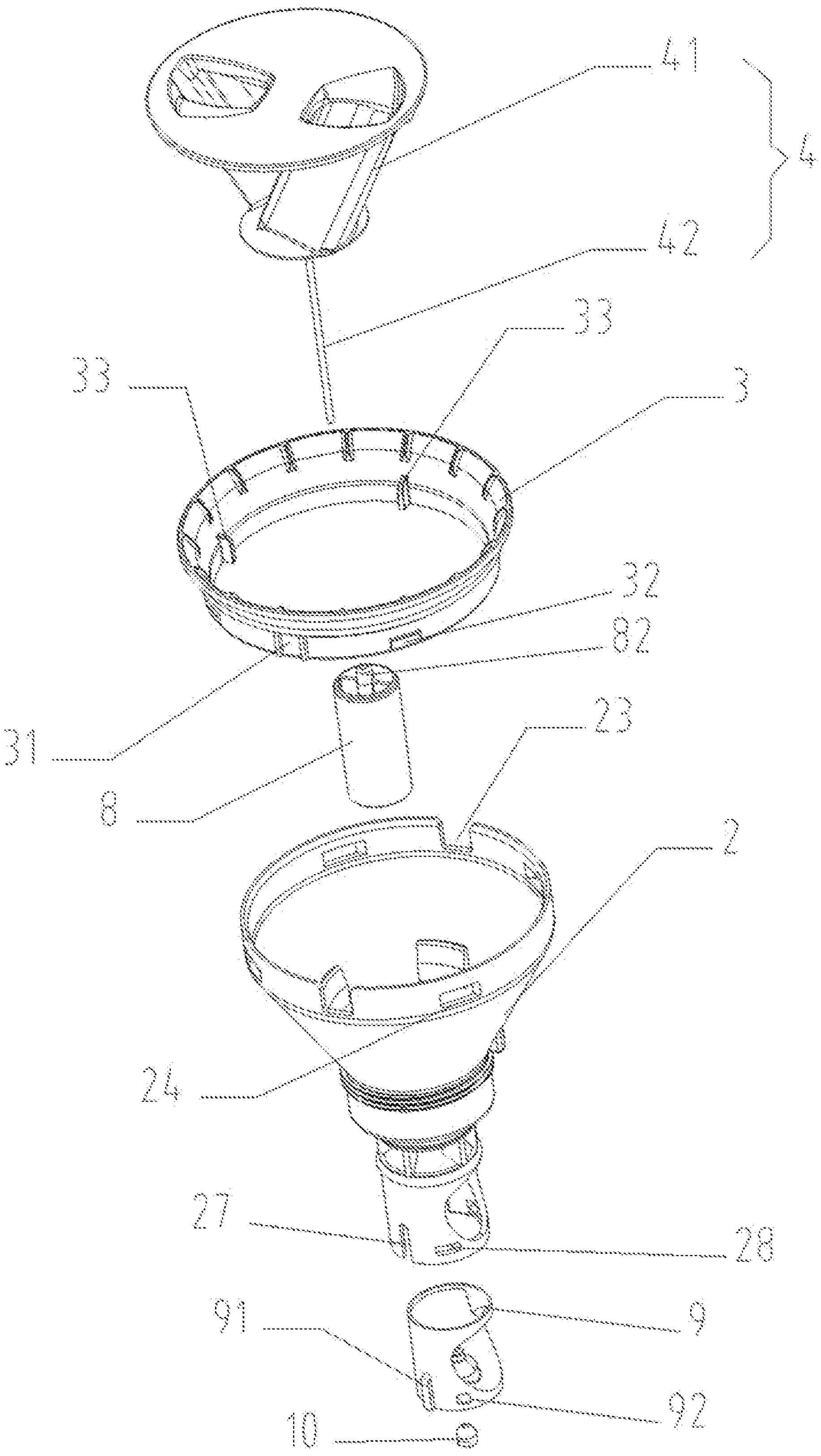
FIG. 3 is a further exploded view of a nozzle core assembly, a nozzle surface cover, and a nozzle core seat in FIG. 2.
Figure 4:
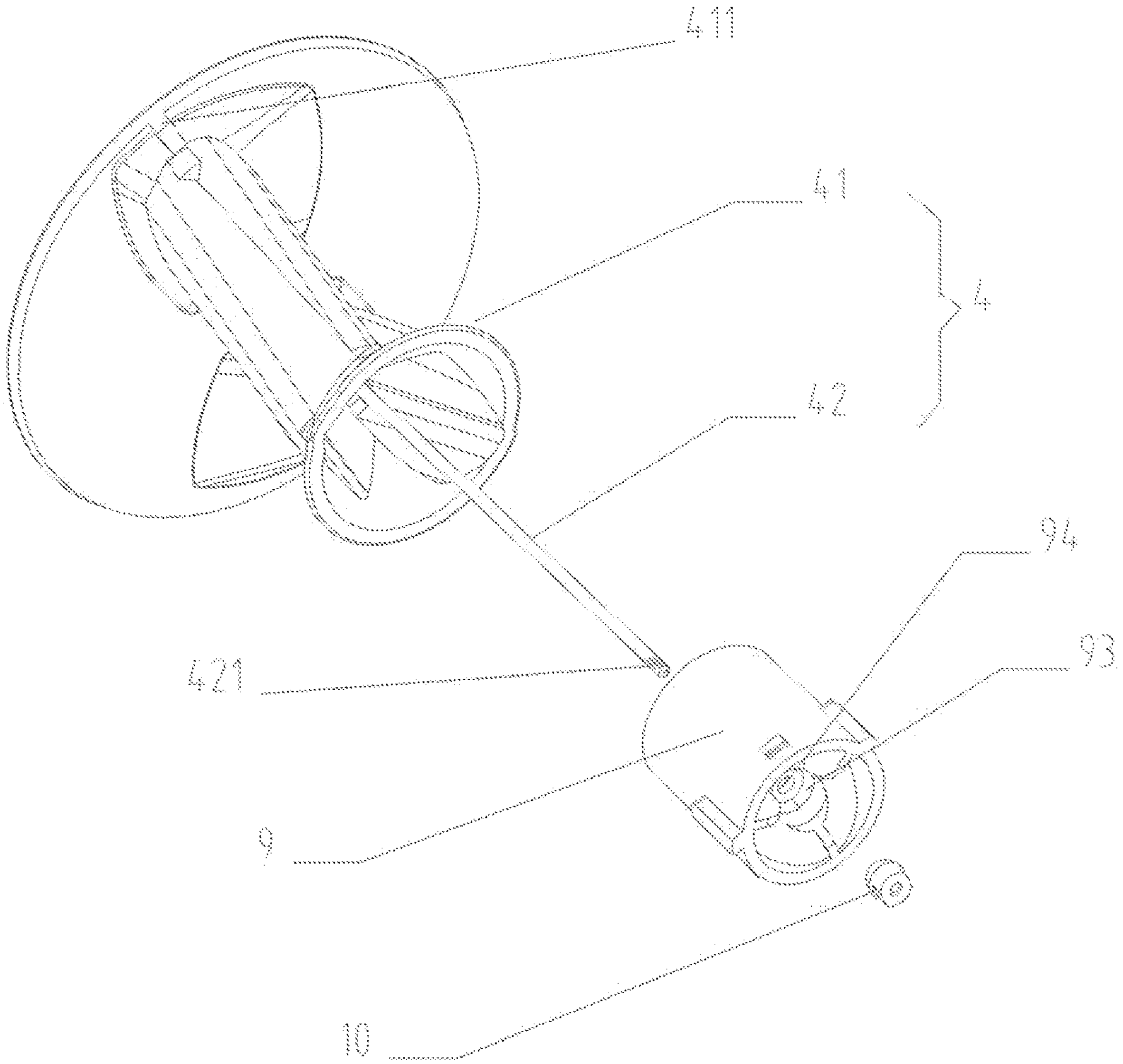
FIG. 4 illustrates a nozzle core assembly, a pull core seat, and a rotary ball head.
Figure 7:
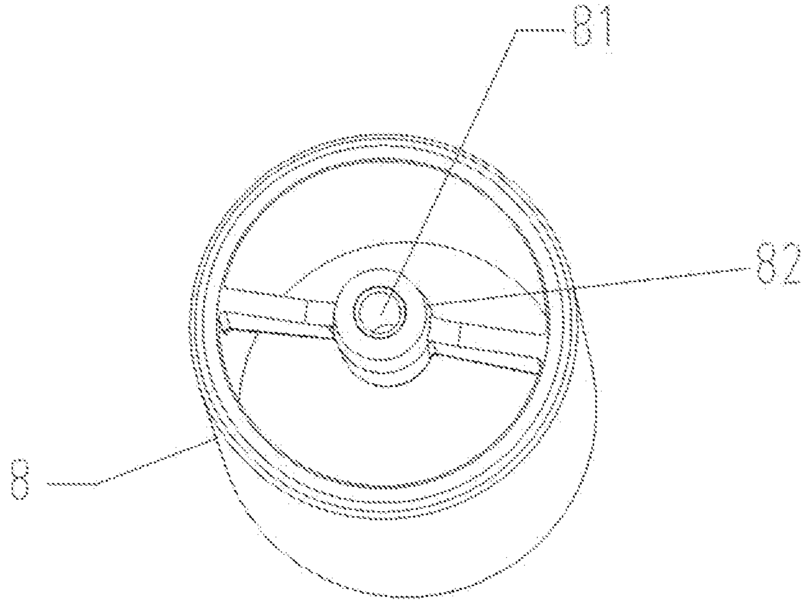
FIG. 7 is a three-dimensional view of a rotary support.

Preferably, referring to FIG. 3 and FIG. 7, to enhance the stability of the nozzle core assembly 4 during rotation, a rotary support 8 is arranged in the nozzle core seat 2, the rotary support 8 is positioned between the pull cavity 93 and the nozzle core 41, and a central axial hole 81 matched with the steel needle 42 is arranged in the rotary support 8. An interior of the rotary support 8 is hollow besides the axial hole 81, and such hollow structure is used for water passing. The second end of the steel needle 42 is arranged in the pull cavity 93 after passing through the central axial hole 81 of the rotary support 8. Further, an outer end of the rotary support 8 surrounding the central axial hole 81 is provided with an axial hole boss 82 which protrudes from the end surface of the axial hole 81 toward the nozzle core 41, so as to strengthen rotary support of the steel needle 42.

Next, other detachable mounting structures of the nozzle are described.

First, referring to FIG. 2 and FIG. 3, mounting structures of the nozzle surface cover 3 and the nozzle core seat 2 are described. The nozzle core seat 2 is provided with upper positioning slots 23 and upper clamping holes 24, an outer surface of the nozzle surface cover 3 is provided with positioning strips 31 matched with the positioning slots 23 and buckles 32 matched with the clamping holes 24 respectively. After the positioning strips 31 are aligned with the upper positioning slots 23 respectively, the nozzle surface cover 3 is pressed until the buckles 32 engage with the upper clamping holes 24 respectively.

Then, with continuing reference to FIG. 3, mounting structures of the nozzle core seat 2 and the pull core seat are described, where the bottom of the nozzle core seat 2 is provided with one or more lower positioning slots 27 and one or more lower clamping holes 28, an outer surface of the pull core seat 9 is provided with corresponding positioning strips 91 matched with the lower positioning slots 27 and buckles 92 matched with the lower clamping holes 28. After the positioning strips 91 are aligned with the corresponding lower positioning slots 27, the pull core seat 9 is pressed until the buckles 92 engage with the corresponding lower clamping holes 28.

Figure 11:
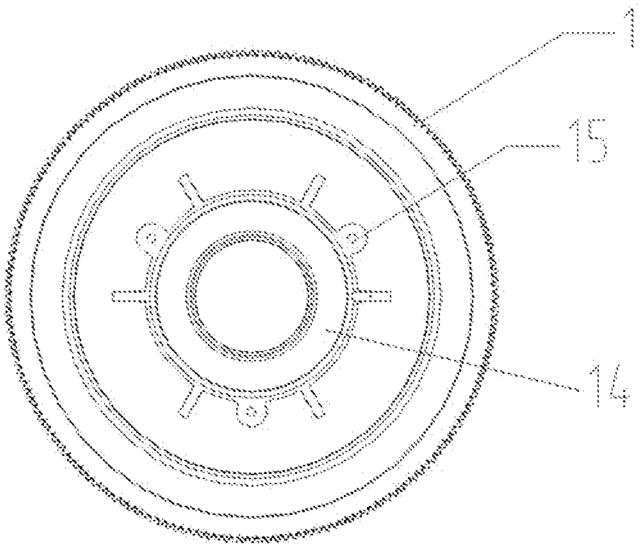
FIG. 11 is a top view of a nozzle holder.
Figure 12:
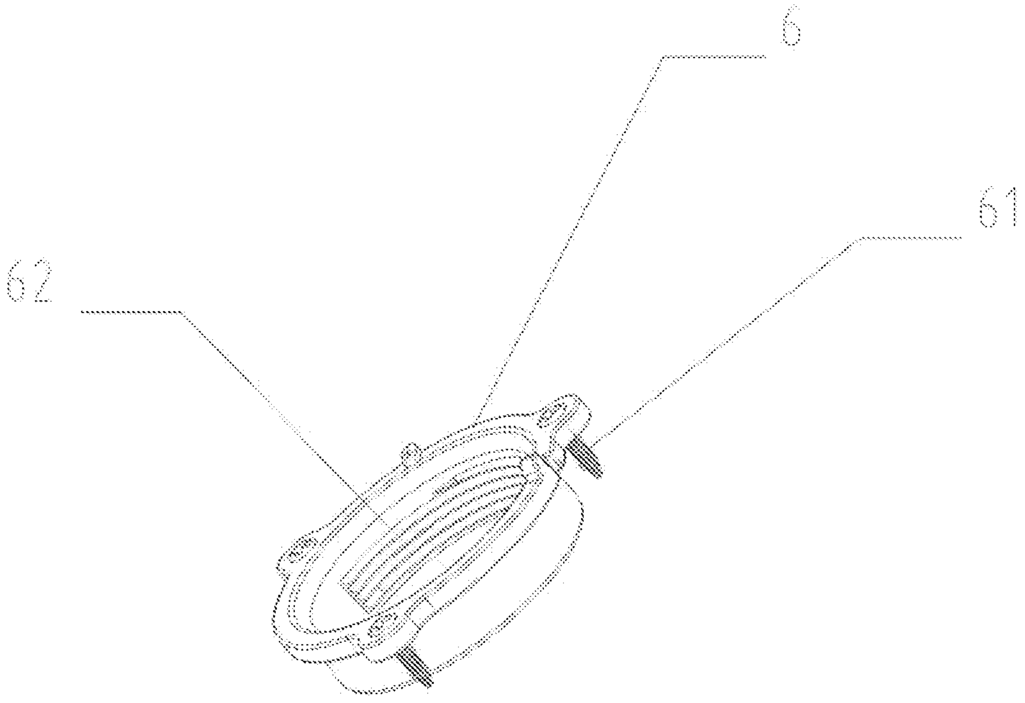
FIG. 12 is a three-dimensional view of a mounting base of a nozzle core seat.

Next, referring to FIG. 2, FIG. 11, and FIG. 12, the mounting base 6 mounts the mounting base 12 in a base cavity 14 of the nozzle holder via screws 61 engaging with the threaded holes 15 of the nozzle holder 1. An inner surface of the mounting base 6 is provided with an internal thread 62, an outer surface of the nozzle core seat 2 is provided with an external thread 25 matched with the internal thread, and the nozzle core seat 2 is mounted in the nozzle holder 1 by threaded connection with the mounting base 6.

Finally, referring to FIG. 1 and FIG. 2, the nozzle holder 1 is provided with an external thread 13, the lock nut 7 is provided with an internal thread 71 matched with the external thread 13, and the lock nut 7 locks and mounts the nozzle holder 1 on a wall by means of threaded connection.

Next, in combination with FIG. 1 and FIG. 2, water inlet and outlet structures of the rotary nozzle are described, where the nozzle core 41 includes a Y-shaped flow channel, the Y-shaped flow channel includes a water inlet and two water outlets in communication with the water inlet. The dynamic torsion ribs 411 are arranged on an outer surface of the Y-shaped flow channel close to the water outlets, the nozzle holder 1 includes an air inlet tube 12 and a water inlet tube 11, a water inlet 21 and an air inlet 22 in communication with the air inlet tube 12 and the water inlet tube 11 respectively are arranged on the nozzle core seat 2, and the water inlet of the Y-shaped flow channel is communicated with the water inlet and the air inlet.

Finally, in combination with FIG. 1, FIG. 2, and FIG. 10, opening and closing of the rotary nozzle are described. When the rotary nozzle needs to be opened or closed to spray water or stop spraying water, the nozzle core assembly 4 may be pressed until the end of the float and sink stroke to form a sinking state, then the nozzle core assembly 4 is rotated manually, the dynamic torsion ribs 411 of the nozzle core assembly 4 contact and abut against the static torsion ribs 33 of the nozzle surface cover 3 during rotation, the nozzle core seat 2, the nozzle surface cover 3, and the nozzle core assembly 4 form one rigid body after the dynamic and static torsion ribs 411 and 33 abut against each other, and the force is exerted on the nozzle core via the water outlets on the nozzle core to drive the surface cover 3 and the nozzle core seat 2 to rotate relative to the nozzle holder 1. When the rotary nozzle needs to be opened, the water inlet 21 of the nozzle core seat 2 is completely aligned with the water inlet tube 11 of the nozzle holder 1. When the rotary nozzle needs to be closed, the water inlet 21 of the nozzle core seat 2 is completely offset from the water inlet tube 11 of the nozzle holder 1. Further, a side of the nozzle core seat 2 that rotates relative to the nozzle holder 1 is further provided with a limit block 26. The limit block 26 may cooperate with a limit boss on the mounting base 6 to realize sensation and perception of limited or predetermined-angle rotation of the nozzle holder 1, and if the nozzle core seat 2 is limited to rotation within 90°, the nozzle may be further rapidly opened or closed via somatic sensation.

In the pull type rotary massage nozzle provided by the present disclosure, with the float and sink design of the nozzle core assembly, the dynamic torsion ribs arranged on the nozzle core assembly and the static torsion ribs arranged on the nozzle surface cover are selectively and rapidly engaging with each other or separated from each other. The nozzle core seat, the nozzle surface cover, and the nozzle core assembly form one rigid body after the dynamic and static torsion ribs abut and match with each other, and the force is exerted on the nozzle core via the water outlets on the nozzle core to drive the surface cover and the nozzle core seat to rotate for disassembly and assembly between the nozzle and the nozzle holder. The pull type rotary massage nozzle retains design of the surface cover with a hollow structure, and still allows the nozzle core assembly to rotate to spray water via the water flow, which not only reduces the thickness of the surface cover and improves the consistency of overall appearance, but also maintains the stability and coordination of rotation. The float and sink design of the nozzle core assembly may also cause the massage nozzle to be rapidly assembled or disassembled and opened or closed, thereby improving the efficiency of disassembly and assembly, reducing the mounting and maintenance costs, and improving the user experience.

The above description is only the specific embodiment of the present disclosure, but those skilled in the art should understand that here is only an example, and the scope of protection of the present disclosure is defined by the appended claims. Therefore, equivalent changes made in the scope of patent application for the present disclosure still fall within the scope of the present disclosure.

What is claimed is:

1. A rotary massage nozzle comprising a nozzle holder, a nozzle core seat, a nozzle surface cover, and a nozzle core assembly assembled in a sequential order;
- wherein the nozzle core seat is detachably mounted on the nozzle holder;
- the nozzle surface cover is fixedly mounted on the nozzle core seat;
- the nozzle core assembly passes through the nozzle surface cover to be mounted in the nozzle core seat, the nozzle core assembly is capable of circumferentially rotating about a mounting axle relative to the nozzle core seat and the nozzle surface cover, and is also capable of axially raising or lowering along the mounting axle relative to the nozzle core seat and nozzle surface cover; and
- an inner surface of the nozzle surface cover is provided with a static torsion rib extending toward the nozzle core assembly, an outer surface of the nozzle core assembly is provided with a dynamic torsion rib extending toward the nozzle surface cover, and the dynamic torsion rib is selectively engaged with or separated from the static torsion rib along with raising or lowering of the nozzle core assembly.

2. The rotary massage nozzle according to claim 1, wherein the nozzle core assembly comprises a nozzle core and a steel needle;
- the steel needle acts as the mounting axle and has a first end fixedly connected to the nozzle core and a second end arranged in a cavity of the nozzle core seat;
- the cavity defines an axial path;
- the second end of the steel needle is capable of freely rotating in the cavity such that the nozzle core assembly is capable of circumferentially rotating; and
- the second end of the steel needle is capable of sliding along the axial path such that the nozzle core assembly is capable of axially raising or lowering.

3. The rotary massage nozzle according to claim 2, wherein the second end of the steel needle is provided with an external thread and is detachably mounted in the cavity by threaded connection with a rotary ball head.

4. The rotary massage nozzle according to claim 2, wherein a bottom of the nozzle core seat is detachably provided with a pull core seat, the pull core seat is provided with the cavity which is recessed in a direction from a bottom of the pull core seat to the nozzle core assembly, the cavity is communicated with an interior of the nozzle core seat via an axial hole, and the second end of the steel needle is arranged in the cavity after passing through the axial hole.

5. The rotary massage nozzle according to claim 4, wherein the pull core seat is an integrated wear-resistant plastic.

6. The rotary massage nozzle according to claim 3, wherein a bottom of the nozzle core seat is detachably provided with a pull core seat, the pull core seat is provided with the cavity which is recessed in a direction from a bottom of the pull core seat to the nozzle core assembly, the cavity is communicated with an interior of the nozzle core seat via an axial hole, and the second end of the steel needle is arranged in the cavity after passing through the axial hole.

7. The rotary massage nozzle according to claim 6, wherein the pull core seat is an integrated wear-resistant plastic.

8. The rotary massage nozzle according to claim 2, wherein a rotary support is arranged in the nozzle core seat and is positioned between the cavity and the nozzle core, a central axial hole matched with the steel needle is arranged in the rotary support, and the second end of the steel needle passes through the central axial hole of the rotary support to be received in the cavity.

9. The rotary massage nozzle according to claim 8, wherein an outer end of the rotary support around the central axial hole is provided with an axial hole boss extending toward the nozzle core.

10. The rotary massage nozzle according to claim 1, wherein the nozzle core comprises a Y-shaped flow channel which comprises a water inlet and two water outlets communicated with the water inlet, and the dynamic torsion rib is arranged on an outer surface of the Y-shaped flow channel close to the water outlets.

11. The rotary massage nozzle according to claim 10, wherein the nozzle holder comprises an air inlet tube and a water inlet tube, a water inlet in communication with the water inlet tube and an air inlet in communication with the air inlet tube are arranged on the nozzle core seat, and the water inlet of the Y-shaped flow channel is communication with the water inlet and the air inlet of the nozzle core seat.

* * * * *